US006942128B1

(12) United States Patent
Walter (10) Patent No.: US 6,942,128 B1
(45) Date of Patent: Sep. 13, 2005

(54) AUTOMATIC DISPENSER FOR UNDERGROUND SPRINKLER-SYSTEMS

(76) Inventor: Damian Walter, 19658 Creek Way, Chugiak, AK (US) 99567

( * ) Notice: Subject to any disclaimer, the term of this patent is extended or adjusted under 35 U.S.C. 154(b) by 0 days.

(21) Appl. No.: 10/614,401

(22) Filed: Jul. 3, 2003

(51) Int. Cl.[7] ................ B65G 47/34; B67D 5/56; B05B 7/26
(52) U.S. Cl. ............... 222/637; 222/129; 222/168.5; 222/144.5; 239/310
(58) Field of Search ................ 222/144, 144.5, 222/367, 345, 344, 168.5, 168, 162, 129, 222/637, 638, 644, 1; 239/310; 137/268; 210/200, 201, 205, 206

(56) References Cited

U.S. PATENT DOCUMENTS

| | | | |
|---|---|---|---|
| 3,260,415 A * | 7/1966 | Kozo Minamiyama et. al. | 222/162 |
| 3,648,900 A * | 3/1972 | Voigt | 222/168.5 |
| 5,022,585 A * | 6/1991 | Burgess | 239/70 |
| 6,230,987 B1 * | 5/2001 | Truong | 239/310 |
| 2002/0145057 A1 * | 10/2002 | Leedy et al. | 239/310 |

* cited by examiner

Primary Examiner—David A. Scherbel
Assistant Examiner—Seth Barney
(74) Attorney, Agent, or Firm—Michael J. Tavella (57) ABSTRACT

An automatic fertilizer that is designed to be used with a yard/lawn/garden sprinkler system. This unit is placed before the zone valves of the sprinkler system. The unit is designed to disperse fertilizer into a tank chamber below a discharge tray. The fertilizer dissolves in the water and is distributed/dispersed to the appropriate sprinkler system zone. The discharge tray has multiple chambers based on the number of zones in the sprinkler system. The chambers in the discharge tray can hold various capacities based on the area covered by each zone within the sprinkler system. The discharge tray turns to dispense the fertilizer as the sprinkler system changes from zone to zone. The discharge tray is automatically moved. The chambers are manually refilled based on the frequency of yard fertilization. The unit has an access from the top to the discharge tray for filling chambers with fertilizer material.

19 Claims, 8 Drawing Sheets

AUTOMATIC DISPENSER FOR UNDERGROUND SPRINKLER-SYSTEMS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to automatic fertilizer systems and particularly to automatic fertilizer systems used with automatic sprinkler systems.

2. Description of the Prior Art

Underground sprinkler systems have been used for many years to water lawns. Typically, these systems use buried flexible PVC pipe to feed a number of sprinkler heads placed about a lawn. Alternatively, perforated pipe may be substituted for the sprinkler heads. In this case, the perforations disburse water into the ground directly watering a lawn.

One advantage of these systems is that fertilizer and other enhancements can be added directly to the water stream, thereby spreading these enhancements over the entire lawn during the watering process. One example of such a device is found in U.S. Pat. No. 6,230,987. This patent describes an applicator that allows a predetermined flow of a fluid for dissolving and distributing soluble substances that comprises a cap and a hollow cylindrical housing. The hollow cylindrical housing comprises of an enlarged chamber having a narrowed inlet port at its lower end. The narrowed inlet port has external threads connecting to a Tee pipe fitting of a pipeline of a fluid system and has a cylindrical flow channel extending to the enlarged chamber. The cylindrical flow channel has six equal V flow passages which are constructed by six vertical dividing walls locating at equal spaces around the wall of the cylindrical flow channel and extending inward to the axis of the cylindrical flow channel. The six equal V flow passages have six equal vertical openings, which are constructed by the vertical dividing walls and disposed outside the cylindrical flow channel of the narrowed inlet port at a predetermined length. The six equal vertical openings comprises of three vertical inlets and three vertical outlets. The six equal vertical openings have a same bottom wall, which is constructed, at the lower end of the vertical dividing walls. The same bottom wall has a diameter smaller than the minor diameter of the external threads of the narrowed inlet port. The system is designed so that when an user turns on his sprinkler system, the inventing applicator will precisely allow a predetermined portion of water in the horizontal flow channel of the Tee pipe fitting into the three vertical inlets 34 through their V flow passages 30 to the enlarged chamber 24 for mixing with and dissolving soluble substances at a predetermined flow ratio. A mixture, which is formed inside the enlarged chamber, flows through the other three V flow passages 30 of the three vertical outlets 34 and is diluted in a downstream flow of water in the horizontal flow channel of the Tee pipe fitting at a predetermined flow 3 ratio. For more effective distribution of the soluble substances to any large areas of lawns, gardens, golf courses, vegetable fields, agricultural fields etc., the user may install the inventing applicators at equal distances along their sprinkler pipelines. This invention helps the user save time, labor and cost for dissolving and distributing the soluble substances into their sprinkler systems. While useful in certain applications it requires several units to distribute the solutions to different zones of a lawn or garden (i.e., on of the units is needed for each zone.)

Another device for distributing such enhancements is found in U.S. patent application 2002/0145057. This application discloses a fertilizer-mixing device for sprinkler systems including a water inlet pipe having a water inlet, a first water outlet, and a second water outlet. The water inlet is in communication with an existing water source. A mixing chamber is adapted for holding a predetermined amount of fertilizer and water therein. The mixing chamber comprises a housing having a first opening therein for receiving the first water outlet of the water inlet pipe therein. The housing has a check valve disposed therein. The check valve includes an input pipe and an output pipe. A water outlet pipe is provided that has a first water inlet, a second water inlet, and a water outlet. The first water inlet is in communication with the second water outlet of the water inlet pipe. The second water inlet pipe is in communication with the output pipe of the check valve of the mixing chamber. The water outlet is connectable with an existing sprinkler system. Thus, this system allows water to enter the mixing chamber, where it mixes with the desired enhancements and then discharges back into the main flow line. Again, while this system works well of a single zone operation, there is no way to dispense fertilizer or other enhancements in balanced and measured amounts to different zones of operation.

BRIEF DESCRIPTION OF THE INVENTION

The instant invention overcomes these difficulties. The unit is an automatic fertilizer that is designed to be used with a yard/lawn sprinkler system; either with below ground or above ground zoned systems. This unit is placed between the backflow check valve and the zone valves of the sprinkler system. The unit is designed to disperse/drop fertilizer into a tank chamber below a discharge tray. The fertilizer than dissolves in the water and is distributed/dispersed to the appropriate sprinkler system zone. The discharge tray has multiple chambers based on the number of zones in the sprinkler system. The chambers in the discharge tray can hold various capacities based on the area covered by each zone within the sprinkler system. The discharge tray turns to dispense the fertilizer as the sprinkler system changes from zone to zone. The discharge tray is automatically moved by a mechanical device. The chambers are manually refilled based on the frequency of yard fertilization. The unit has an access from the top to the discharge tray for filling chambers with fertilizer material.

It is an object of this invention to produce an automatic dispenser for underground sprinkler systems that dispenses fertilizers and other enhancements to multiple zones from a single location.

It is another object of this invention to produce an automatic dispenser for underground sprinkler systems that can be used in a variety of locations, such as gardens, lawns, and other outdoor areas.

DETAILED DESCRIPTION OF THE INVENTION

Figure 1:
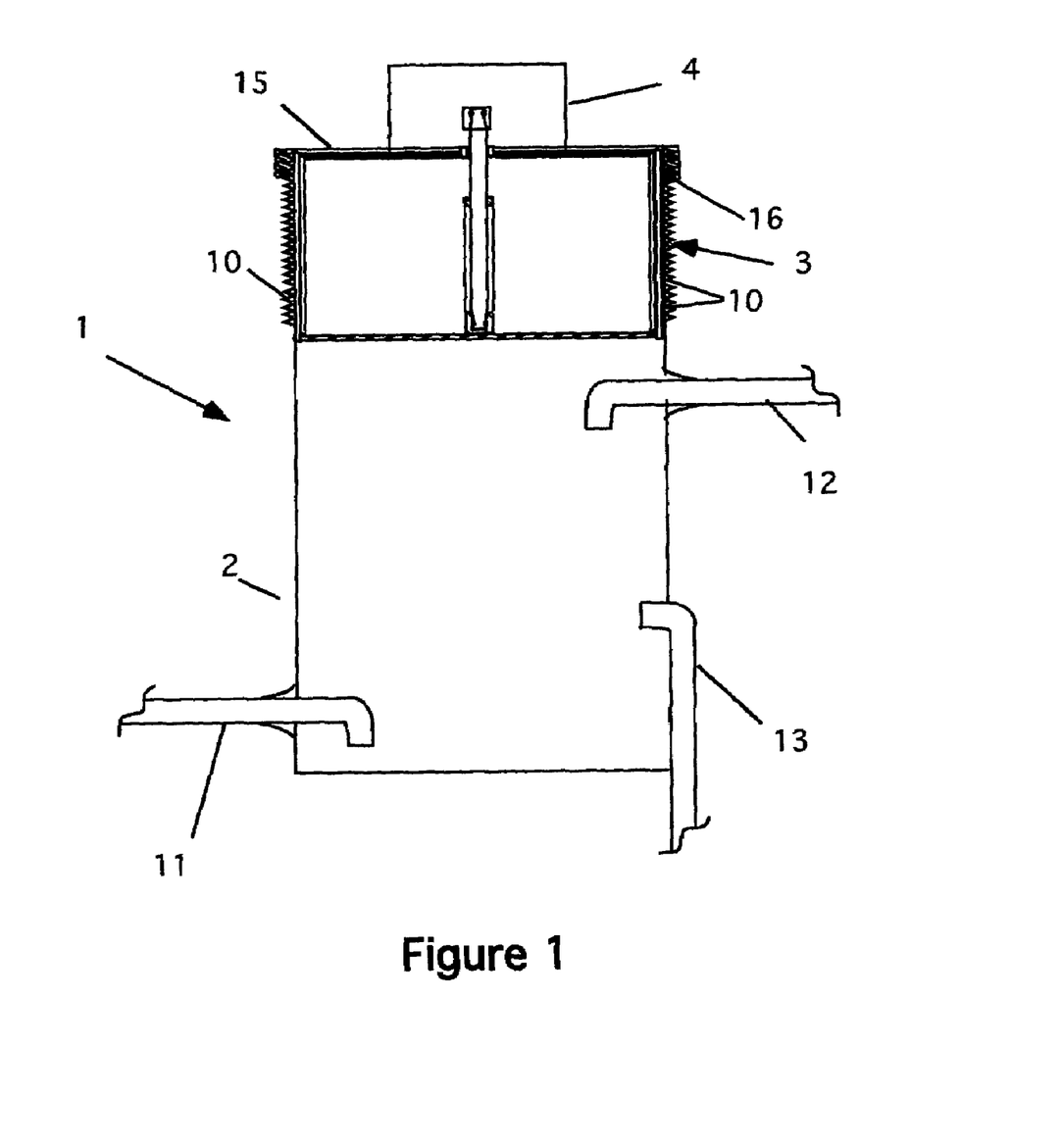
FIG. 1 is a cross-sectional view of a first embodiment of the invention.

Referring now to FIG. 1, a cross-sectional view of the first embodiment 1 is shown. The major components of this embodiment are an agitation tank 2, a dispensing system 3 and a drive motor 4. The system 1 is typically placed in a sprinkler system between the backflow check valve (not shown) and the zone valves (see FIG. 9) of the sprinkler system. In this way, the unit 1 can service all the zones from one location.

The tank 2 has a number of threads 10 formed about the outside of the top of the tank. The threads 10 are used to secure the lid of the dispensing system 3, as discussed below. As an alternative, latches can be used instead of the threads. The tank 2 has an inlet pipe 11 and an outlet pipe 12. The inlet pipe is positioned near the bottom of the tank. For example, in the preferred embodiment, the inlet pipe is placed about ½ inch (12 mm) above the bottom of the tank to allow water to enter the tank at the bottom. The exit pipe is positioned at a point just below the dispensing system. These locations ensure that the incoming water is thoroughly mixed within the tank. In the preferred embodiment, the tank 2 is a four-gallon tank. However, the exact size of the tank can vary.

A drainage pipe 13 is also provided to drain off water. This pipe is fitted with a drainage relief valve to drain off water when the unit is not being used and when the system is between zones. This reduces the pressure and the resistance of the water when turning the dispensing tray. Note that this drain mechanism must be adjusted based on the water pressure of individual locations. The drain mechanism can also be controlled electronically using a trigger valve or similar mechanism that is ties into the main system controller.

Figure 2:
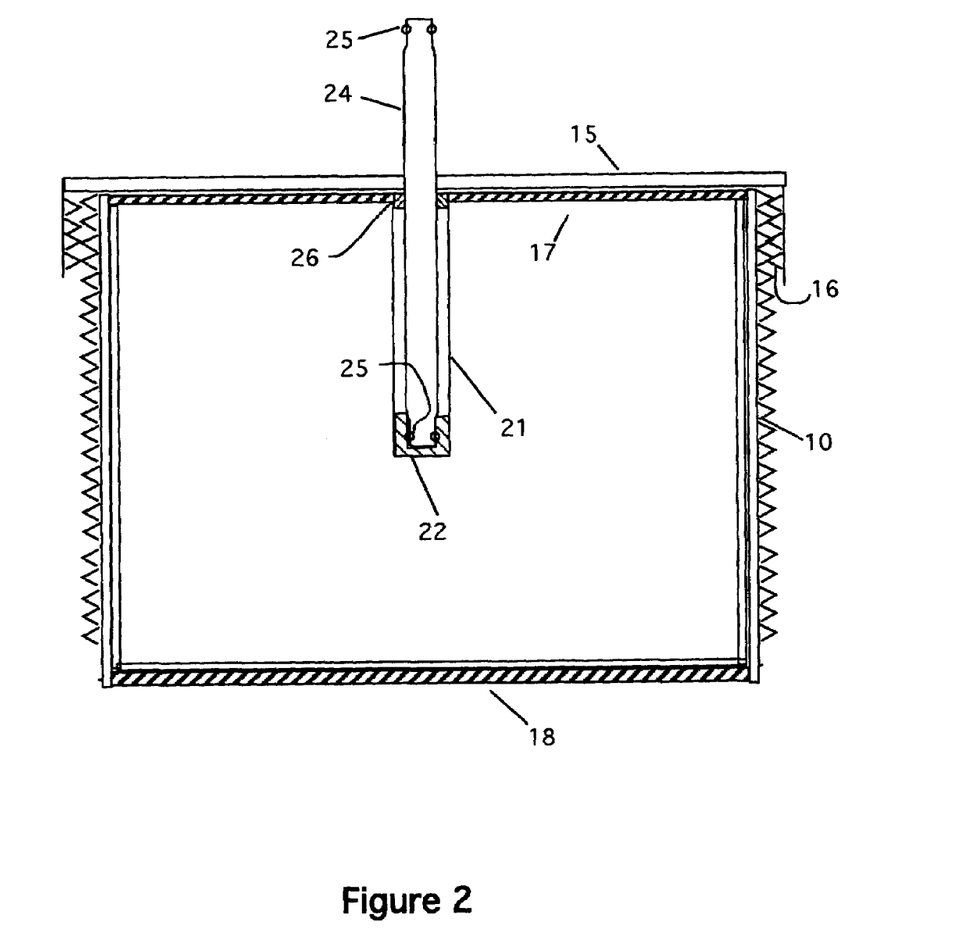
FIG. 2 is an enlarged cross-sectional view of the dispensing chamber.
Figure 10:
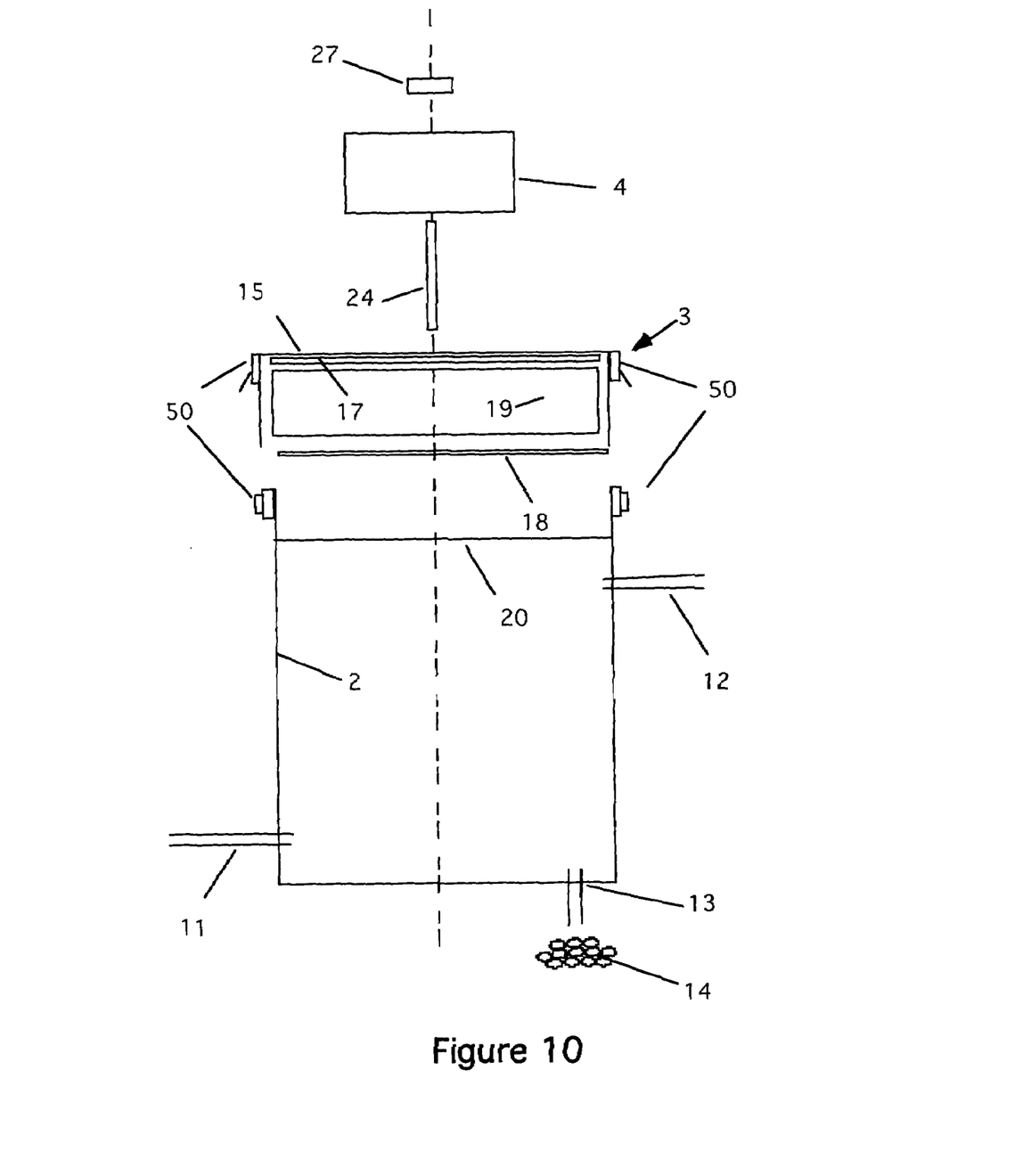
FIG. 10 is an exploded view of the key components of an embodiment.

The dispensing system 3 is shown in cross section in FIG. 2. The system has an outer lid 15 that has threads 16 formed thereon. The threads 16 mate with the threads 10 on the tank when the dispensing system 3 is placed in the tank and the lid 15 is screwed onto the top of the tank 2. Alternatively, a set of latches 50 can be used to secure the dispensing tray into the tank. The latches 50 are shown in FIG. 10.

Figure 6:
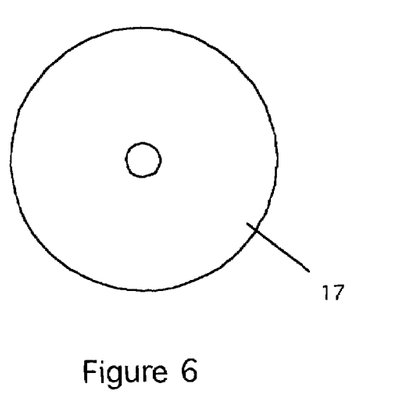
FIG. 6 is a plan view of the top neoprene disk of the dispensing system.
Figure 7:
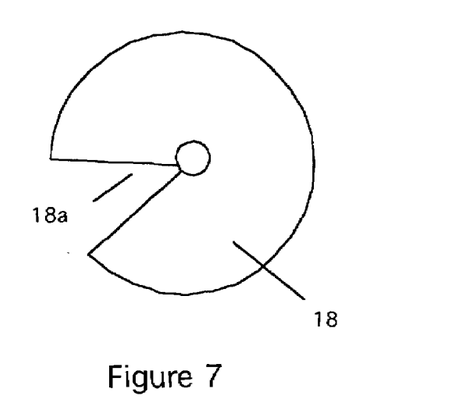
FIG. 7 is a plan view of the bottom neoprene disk of the dispensing system, sized for an eight-chamber dispenser.
Figure 7A:
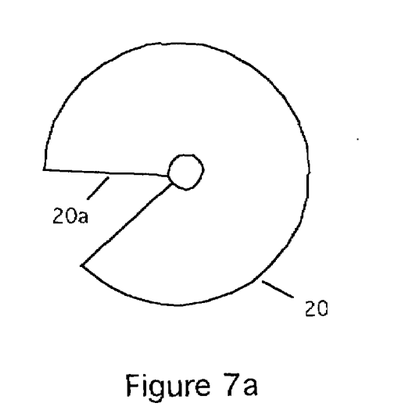
FIG. 7a is a plan view of the bottom of the dispensing tray of the dispensing system, sized for an eight-chamber dispenser.

In the preferred embodiment, the case 15 has a neoprene top disk 17 (see also FIG. 6), and a neoprene bottom disk 18 (see FIG. 7). Of course, rubber or a similar material can be used in place of the neoprene, if desired. A dispenser tray 19 (see FIG. 8) forms the body of the dispensing system. A bottom tray platform 20 (see FIG. 7a) sits under the dispensing tray and the bottom neoprene disk 18. The bottom tray platform 20 is fixed in the tank.

Figure 8:
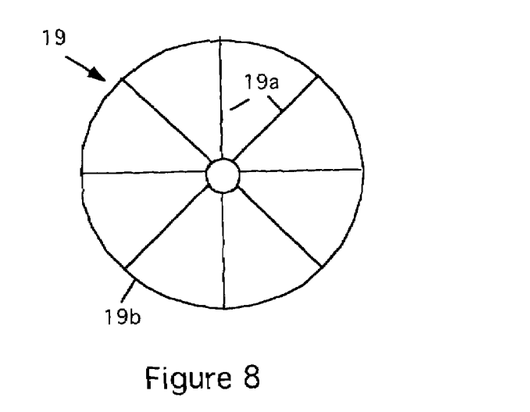
FIG. 8 is a plan view of an eight-zone dispensing dish, as part of the dispensing system.

As shown in FIG. 6 neoprene top disk 17 is a solid circle of material. The neoprene bottom disk 18 and a tray platform 20 (see FIG. 3) have a pie-shaped area removed. This pie-shaped area conforms to the size of the individual compartments of the dispensing tray 19. FIG. 8 shows a dispensing tray 19 with eight compartments. This is the preferred number of compartments because it can be used if fewer than eight zones are employed. Of course, trays having 4, 6, 10 or 12 compartments can be also used. However, these are not preferred because an eight-tray unit can dispense material to a smaller number of zones and having multiple section trays increases cost and inventory.

Referring again to FIG. 2, the center of the dispensing tray 19 has a socket 22 formed at the bottom of a center tube 21. In the preferred embodiment, the center tube is formed of PVC plastic. The socket 22 is formed of a stainless steel insert. A drive shaft 24 is placed in the center tube and is secured in the socket using ball bearings 25 that fit into detents in the socket 22. This type of locking mechanism is common in the art and any similar type of locking mechanism can be used as well. As shown in FIG. 2, the shaft 24 extends above the top of the dispensing tray 19. A rubber (or similar material) seal 26 is placed around the shaft as shown to seal the dispensing tray to prevent leaks. The top of the shaft 24 attached to the drive motor 4 (see FIG. 1). The purpose and use of the drive motor 4 are discussed in detail below.

Figure 3:
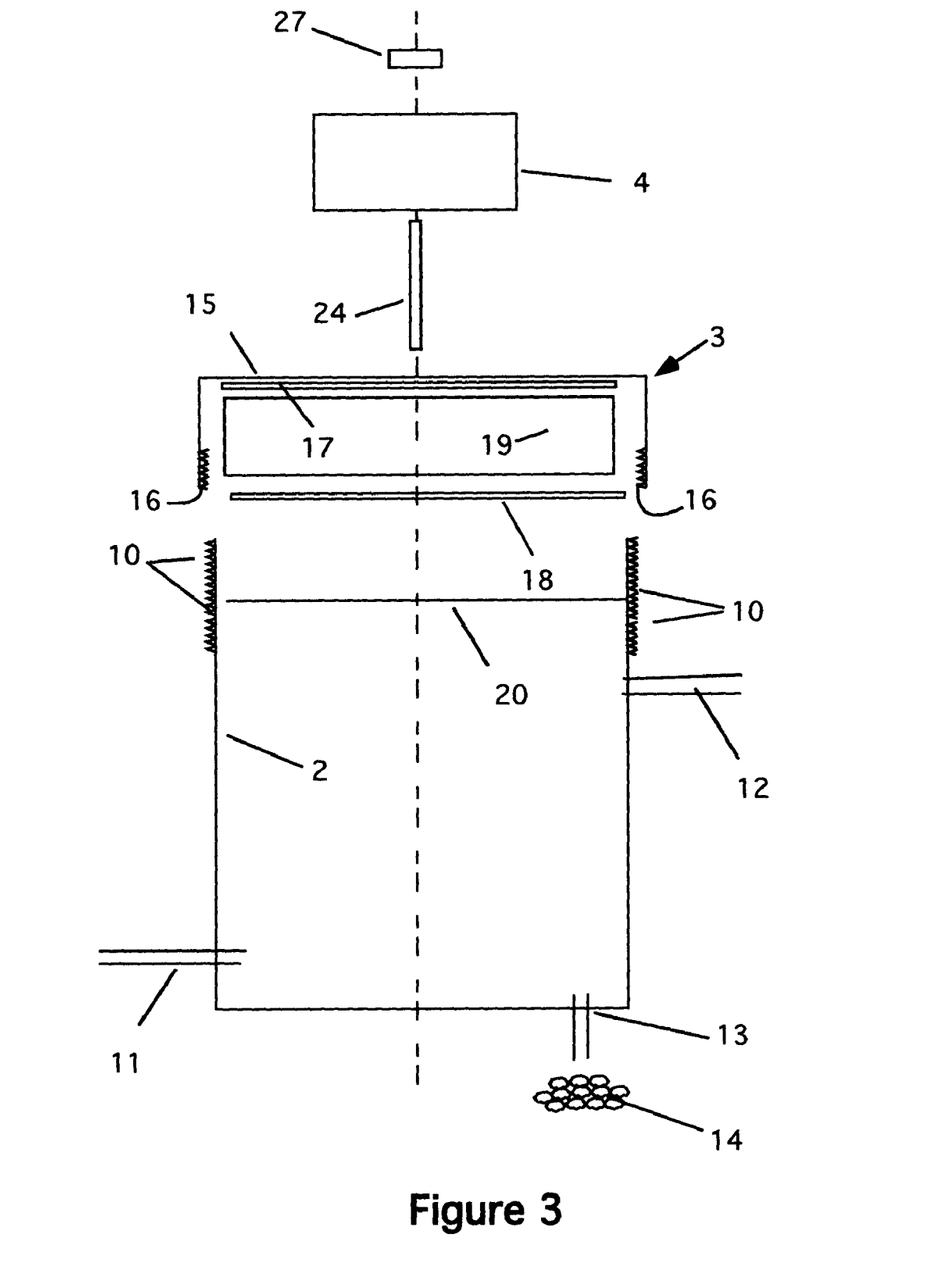
FIG. 3 is an exploded view of the key components of the first embodiment.

FIG. 3 is a partially exploded view of the first embodiment 1. Here, the mixing tank 2 is shown separate from the dispensing system 3 and the motor 4. The view shows the shaft 24 positioned between the dispensing system 3 and the motor 4. The bottom neoprene gasket 18 is shown as well. This view also shows a junction box 27 (see FIG. 9) that is used to house the control wires, as discussed below.

Finally, this view shows the drain tube 13 located in an alternative position at the bottom of the tank. This view also shows that in the preferred embodiment, the drain is designed to drain into a layer of gravel 14 placed under the tank 2.

Finally, the tray platform 20 is shown in position. This platform is fixed in place. As the dispensing tray turns, the tray compartments align with the opening in the tray platform to dispense the fertilizer or other product.

Figure 4:
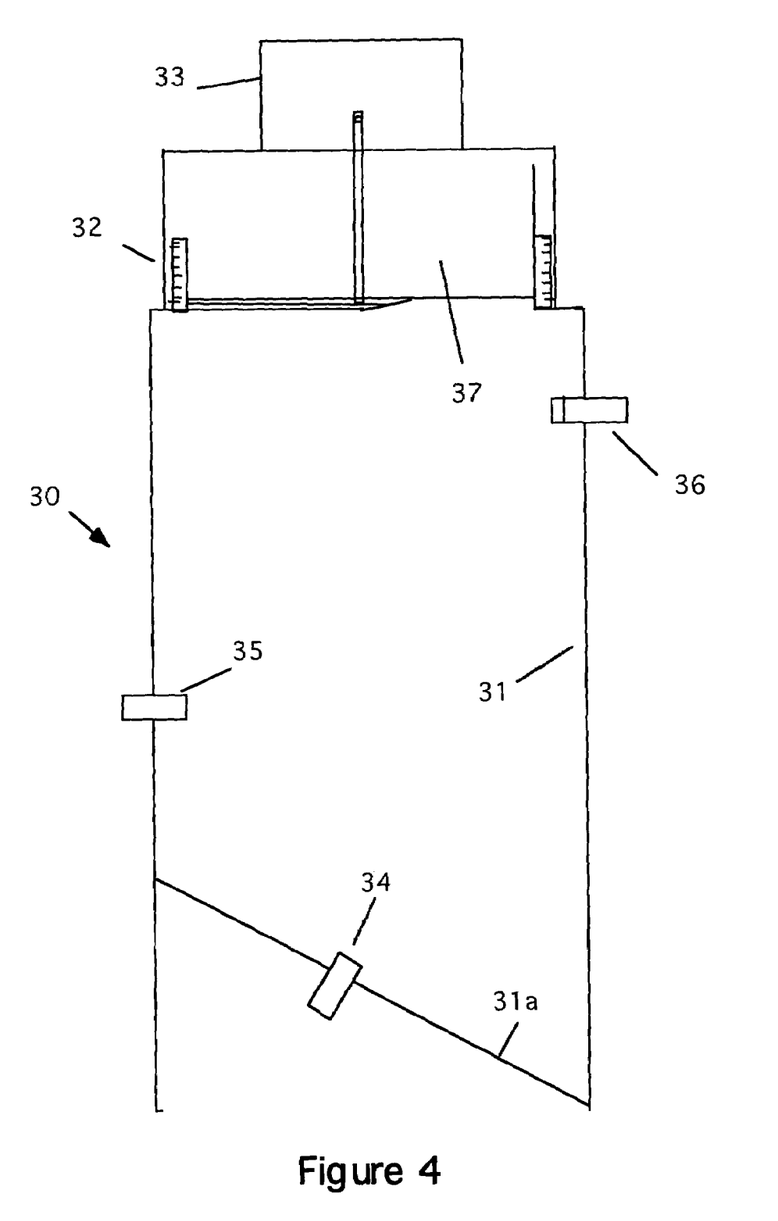
FIG. 4 is a cross-sectional view of a second embodiment.

FIG. 4 is a cross-section of a second embodiment 30. This system is similar to the first embodiment in that it has a tank 31, a dispensing system 32, and a motor 33. The dispensing system 32 and a motor 33 are identical to those discussed in the first embodiment. The difference here is in the tank 31. In this embodiment, the tank has a slanted base 31a. The drain 34 is located in the center of the base as shown. The use of the slanted base allows for the creation of a settlement area at the bottom of the tank. The inlet port 35 and the outlet port 36 are similar to the first embodiment. In this view, the drop space 37 for the product is shown as a thin area adjacent to the bottom of the dispensing tray. In this embodiment, the tank has a preferred size of between about 3 and 5 gallons.

Figure 5:
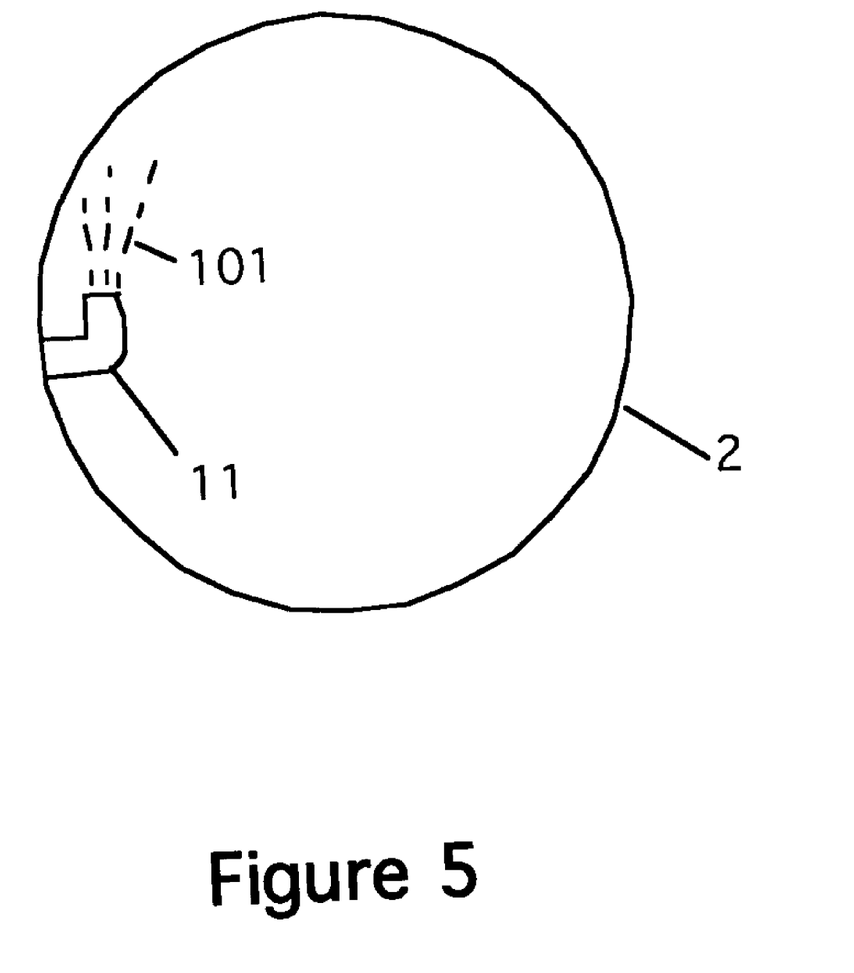
FIG. 5 is a plan view of the chamber of the second embodiment taken along the lines 5—5 of FIG. 4.

FIG. 5 is a plan view of the tank showing the inlet pipe 11. In the preferred embodiment, the inlet pipe is placed at a 90-degree angle so that as water enters the tank it moves about the inner wall of the tank. Note that the figure shows the water flow 101 entering the tank and following the sidewalls. In this way, the water entering the tank aids in swirling the tank contents to ensure complete mixing within the tank.

FIG. 6 is a plan view of the top disk 17. This disk is generally solid except for a center hole to allow the shaft 24 to pass through. In the preferred embodiment, this disk is approximately ⅛ inch (3 mm) to ½-inch (12) mm thick. Note that the top disk 17 can be adhered to the underside of the lid 15, although it does not have to be. FIG. 7 is a view of the bottom disk 18. This disk is also approximately ⅛ inch (3 mm) to ½-inch (12) mm thick. Here, the disk has a wedge-shaped portion 18a cut out. In the preferred embodiment, the edges of the wedge-shaped portion 18a are reinforced to reduce tearing. The wedge-shaped portion 18a matches the size and shape of the compartments in the dispensing tray. Note that the bottom tray 18 can be adhered to the top of the tray platform, if desired.

The dispenser tray 19 is shown in plan view in FIG. 8. In this view, the compartments are shown. Note that each compartment is formed by a number of retaining walls 19a that extend upward to form the compartments. The outer edges of the tray are sealed by an exterior wall 19b.

A tray platform 20 (see FIG. 7a) sits under the dispensing tray and the bottom neoprene disk 18. Like the bottom disk 18, the tray platform 20 has a wedge-shaped area 20a removed.

Figure 9:
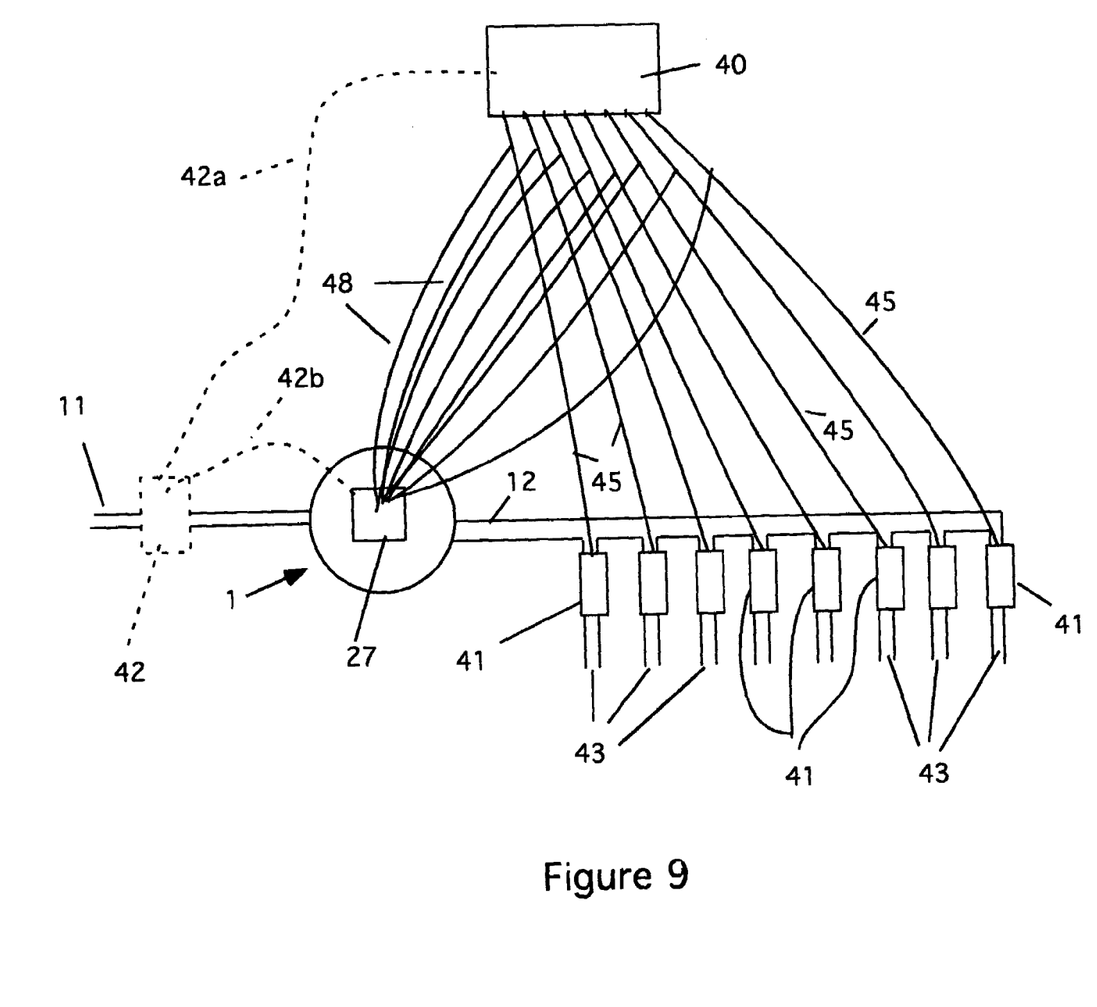
FIG. 9 is a representational wiring diagram for the control system.

Referring now to FIG. 9, details of the control system are shown. The sprinkler system zone valve control panel 40 controls distribution of water to different zones by operating a series of zone valves 41. An optional main valve 42 (in dashed lines) is also shown. The optional main valve 42 can be energized from the control panel 40 or from the junction box 27 using the wires 42a or 42b (also shown in dashed lines). In the figure, eight zone valves are shown. Of course, this number can vary depending on the size of the system. Also shown in the figure are the inflow pipe 11, the outflow pipe 12 and the unit 1 in place.

The outflow pipe 12 is shown acting as a manifold for the eight zone valves in this system. Each zone valve has an outlet pipe 43 that feeds the sprinklers in each zone. The system is designed to switch the flow from zone to zone at regular intervals. Each zone valve is opened for a period of time to ensure adequate watering for each zone. The zone valves are connected to the control box 40 by wires 45 or their equivalent (such as a wireless connection). FIG. 9 also shows a parallel set of wires 48 that extend from the controller to the junction box 27 mounted to the motor 4 on the unit 1. These wires are connected to the drive motor controller. When a zone is activated, the motor turns the dispensing tray to the next position, where the contents of that particular compartment are allowed to fall (dispense) into the tank 2. The system then stops the motor, even though the zone valve is still open. This allows time for the fertilizer or other enhancement to dissolve completely and to disburse through the sprinklers in the zone. Once the proper timing sequence has been completed, the system shifts to the next zone and the process is repeated. In this way, all zones are fed with the fertilizer or other enhancements in a balanced manner automatically.

The timing of the cycle depends on the water pressure and the material to be mixed. For example, at water pressures of 35 psi or less, it takes seven minutes for the material to dissolve and two minutes for it to be thoroughly disbursed through the zone. At water pressures above 35 psi, it takes four minutes to dissolve the material and two minutes to disburse the material though a zone.

FIG. 9 also shows an optional main control valve 42. This valve is used to shut down water flow when the device is switching zones. This allows the tank to drain, and, as discussed above, makes turning the dispensing tray easier. The valve is timed to open so that the system can operate in an optimal fashion.

FIG. 10 is a detail view of an embodiment of the device in which the threads on the dispensing tray and tank have been replaced with latches 50. The latches are common to the art and are placed about the perimeter of the tank and dispensing tray as desired. As shown, a minimum of two latches 50 is required.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

What is claimed is:

1. An apparatus for disbursing fertilizer and the like in a sprinkler system having multiple zones with a plurality of zone valves comprising:
   a) a tank, having an inlet, an outlet and an open top;
   b) a dispenser tray having at least two compartments, each of said compartments having an open bottom;
   c) a bottom plate, said bottom plate being fixedly installed in said tank, said bottom plate also conforming to the size and shape of said dispenser tray, said bottom plate further having an opening formed therein, said opening conforming to the size and shape of one of said at least two compartments;
   d) a means for securing said dispensing tray in said open top of said tank;
   e) a means for turning said dispenser tray; and
   f) a means for controlling said means for turning said dispenser tray, whereby said means for controlling operates to coordinate the rotation of said dispenser tray to the operation of the plurality of zone valves.

2. The apparatus for disbursing fertilizer of claim 1 further comprising an outer lid, removably installed on the open top of said tank.

3. The apparatus for disbursing fertilizer of claim 2 wherein the means for securing said dispensing tray comprises a set of mating threads formed on said tank and a matching set of threads formed on the outer lid.

4. The apparatus for disbursing fertilizer of claim 1 wherein the means for securing said dispensing tray comprises at least two latches attached to said tank and said dispenser tray.

5. The apparatus for disbursing fertilizer of claim 1 wherein the means for turning said dispenser tray comprises a motor.

6. The apparatus for disbursing fertilizer of claim 1 wherein the means for controlling said means for turning said dispenser tray comprises:
   a) a timer; and
   b) a motor controller, attached to said timer, whereby when said timer activates said motor controller causes the means for turning said dispenser tray to operate.

7. An apparatus for disbursing fertilizer and the like in a sprinkler system having multiple zones with a plurality of zone valves comprising:
   a) a tank, having an inlet, an outlet and an open top, and an outside;

b) a dispenser tray having at least two compartments, each of said compartments having an open bottom;

c) a bottom plate, said bottom plate being fixedly installed in said tank, said bottom plate also conforming to the size and shape of said dispenser tray, said bottom plate further having an opening formed therein, said opening conforming to the size and shape of one of said at least two compartments;

d) a means for securing said dispensing tray in said open top of said tank;

e) a motor attached to said dispenser tray; and f) a means for controlling said means for turning said dispenser tray, whereby said means for controlling operates to coordinate the rotation of said dispenser tray to the operation of the plurality of zone valves.

8. The apparatus for disbursing fertilizer of claim 7 further comprising an outer lid, removably attached to said tank.

9. The apparatus for disbursing fertilizer of claim 8 wherein the means for securing said dispensing tray comprises a set of mating threads formed on the outside of said tank and a mating set of threads formed on said outer lid.

10. The apparatus for disbursing fertilizer of claim 7 wherein the means for securing said dispensing tray comprises at least two latches attached to said tank and said dispenser tray.

11. The apparatus for disbursing fertilizer of claim 7 wherein the means for controlling said means for turning said dispenser tray comprises:

a) a timer;

b) a motor controller, attached to said timer, whereby when said timer activates said motor controller causes the means for turning said dispenser tray to operate; and c) a master control valve, said master control valve positioned in an inlet pipe.

12. The apparatus for disbursing fertilizer of claim 10 further comprising a drain, positioned in the tank whereby when said drain is open, water contained in said tank is evacuated through said drain.

13. A method of disbursing fertilizer using an apparatus having an apparatus for disbursing fertilizer in a sprinkler system having multiple zones with a plurality of zone valves comprising: a tank having a plurality of threads formed thereon, having an inlet pipe, an outlet and an open top; a dispenser tray having at least two compartments, each of said compartments having an open bottom; a bottom plate, said bottom plate being fixedly installed in said tank, said bottom plate also conforming to the size and shape of said dispenser tray, said bottom plate further having an opening formed therein, said opening conforming to the size and shape of one of said at least two compartments; an outer lid, having a plurality of threads formed thereon; a motor attached to said dispenser tray; and a means for controlling said means for turning said dispenser tray, whereby said means for controlling operates to coordinate the rotation of said dispenser tray to the operation of the plurality of zone valves comprising the steps of:

a) securing said dispensing tray in said tank;

b) placing a quantity of fertilizer in the compartments of said dispensing tray, producing plurality of quantities of fertilizer equal to the number of compartments in said dispensing tray;

c) activating said means for controlling means for turning said dispenser tray;

d) filling said tank with a quantity of water;

c) causing one of said plurality of quantities of fertilizer to enter the tank;

d) mixing said one of said plurality of quantities of fertilizer with said quantity of water forming a mixture;

e) dispensing said mixture through the outlet;

f) rotating the dispenser tray after a prescribed operating time; and f) repeating steps d–f for each of said plurality of compartments in said dispensing tray.

14. The method of claim 13 wherein the mixture produced from one of said plurality of quantities of fertilizer from a particular compartment and said quantity of water is dispensed to a particular zone.

15. The method of claim 13 wherein the means for controlling means for turning said dispenser tray further controls the plurality of zone valves.

16. The method of claim 15 wherein said means for controlling means for turning said dispenser tray operates to switch from one of said plurality of zone valves to another of said plurality of zone valves after a specified time.

17. The method of claim 16 where the apparatus further comprises:

a) a master control valve, installed in said input line; and b) a drain line, installed in said tank.

18. The method of claim 17 wherein when said means for controlling means for turning said dispenser tray operates to switch from one of said plurality of zone valves to another of said plurality of zone valves said method further comprises the steps of:

a) closing said master valve; and b) draining said tank through said drain.

19. The method of claim 13 wherein the step of securing said dispensing tray in said tank comprises the steps of:

a) placing the dispensing tray into said tank;

b) placing said outer lid onto the open top of said tank;

c) engaging the plurality of threads on the tank with the plurality of threads on the outer lid; and d) screwing the outer lid onto the tank.

* * * * *